United States Patent Office 3,444,189
Patented May 13, 1969

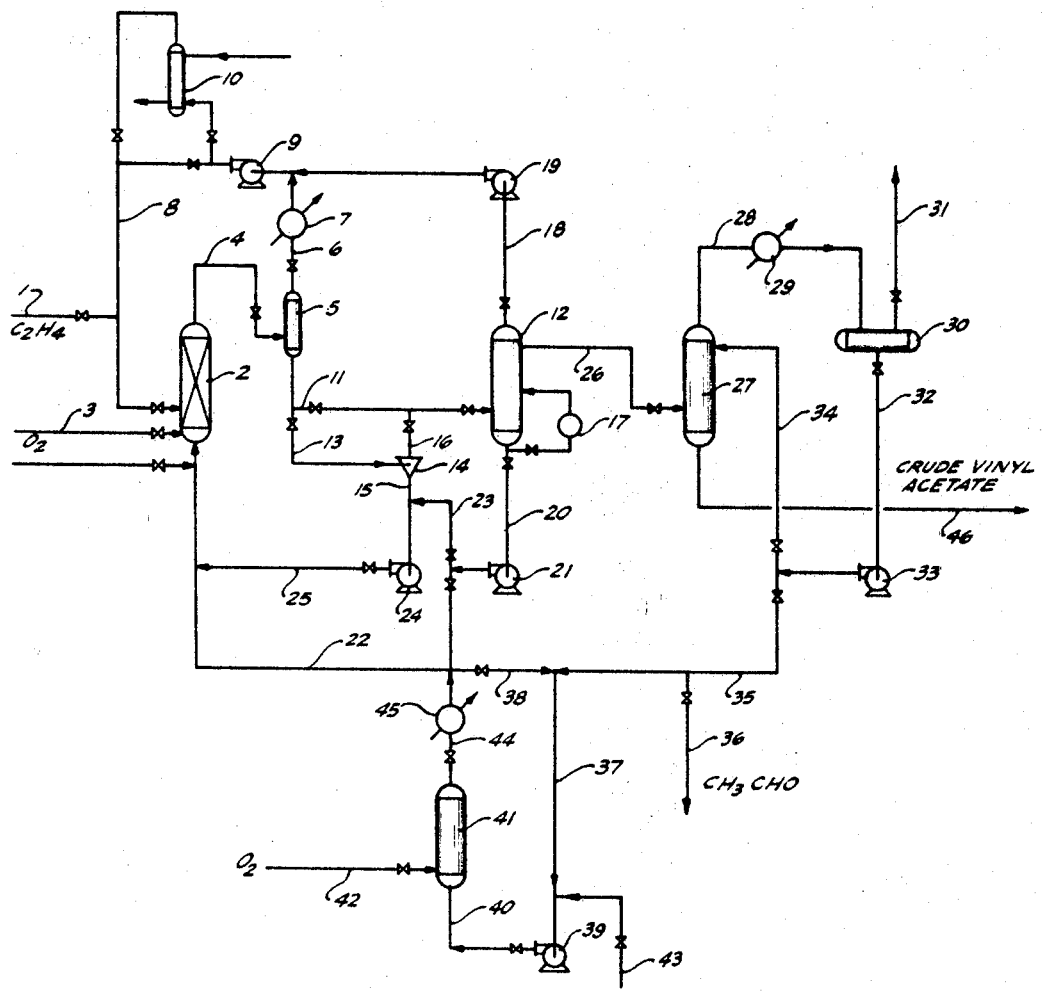
FIGURE

3,444,189
VINYL ACETATE SYNTHESIS
Kenneth L. Olivier, Placentia, Calif., assignor to Union Oil Company of California, Los Angeles, Calif., a corporation of California
Continuation-in-part of application Ser. No. 301,239, Aug. 12, 1963. This application May 12, 1966, Ser. No. 557,848
Int. Cl. C07c *67/04, 69/02*
U.S. Cl. 260—497                                   6 Claims

ABSTRACT OF THE DISCLOSURE

The invention comprises the oxidation of ethylene to vinyl acetate under liquid phase conditions using a reaction medium comprising acetic acid and a platinum group metal with a nitrogen oxide compound as a redox agent. Oxygen and ethylene are introduced into contact with the reaction medium and the products from the oxidation comprise vinyl acetate and acetaldehyde, the latter being recycled for oxidation to acetic acid to replenish the acetic acid consumed in the formation of the vinyl acetate. The invention is based upon the discovery that the acetaldehyde can be readily oxidized to acetic acid in the reaction zone in the presence of nitrogen oxides and higher yields of acetic acid are attainable than can be achieved with other conventionally used redox agents such as the multivalent heavy metal salts.

DESCRIPTION OF THE INVENTION

This application is a continuation-in-part of my co-pending application Serial Number 301,239 filed Aug. 12, 1963, now abandoned.

This invention relates to a method for the oxidation of ethylene to vinyl acetate and in particular relates to the oxidation of acetaldehyde produced in the aforesaid process.

While acetaldehyde is fairly susceptible to oxidation, difficulties are experienced in obtaining a high yield of acetic acid from the oxidation of the aldehyde while avoiding undesired production of carbon oxides. Various transitional metals have been suggested by the prior art as catalysts for this oxidation, the most common being cobalt, manganese, vanadium, copper, uranium, iron, platinum, cerium and chromium in the forms of their oxides or salts in a liquid reaction medium or distended on a solid support. Of these, the most commonly employed are cobalt, manganese and copper. I have found, however, that when employing the various prior art suggested catalysts, between 10 and about 20 mol percent of the oxidized products are carbon oxides.

It is an object of this invention to provide a process for the oxidation of acetaldehyde to acetic acid that can advantageously be combined with a vinyl acetate synthesis by oxidation of ethylene in the presence of catalytic amounts of a platinum group metal to provide a unitary process for vinyl acetate that consumes only ethylene and oxygen as raw materials.

Other and related objects will be apparent from the following discussion.

I have now discovered that nitrogen oxides when employed in catalytic amounts are very effective oxidation catalysts for the oxidation of acetaldehyde to acetic acid. Specifically, the invention comprises the oxidation of acetaldehyde to acetic acid in a substantially anhydrous acetic acid medium by incorporating between about 0.01 and about 3.0 weight percent of a nitrogen oxide compound in the acetic acid and thereafter contacting the reaction medium with an oxygen containing gas at temperatures between about 20° and about 200° C. at pressures sufficient to maintain liquid phase conditions.

Under the aforesaid conditions, I have discovered that the yield of acetic acid from the aforementioned oxidation is from 97 to 99 mol percent yield and the carbon oxide mol percent yield does not exceed about 1 to about 2 mol percent.

Various nitrogen oxides can be employed as the catalyst in this oxidation and can comprise between about 0.01 and about 3.0 weight percent of the reaction medium; preferably between about 0.1 and about 1.0 weight percent; calculated as nitrogen dioxide. If desired, a nitrogen oxide gas such as nitric oxide, nitrogen dioxide, nitrogen tetraoxide, etc., can be admixed with the oxygen containing gas and introduced into the oxidation reactor concurrently therewith. Preferably, however, the nitrogen oxides are added as soluble nitrite or nitrate salts to the reaction medium. Examples of suitable salts are the alkali metal and ammonium salts such as sodium nitrate, lithium nitrite, potassium nitrate, cesium nitrite, ammonium nitrate, etc. It is also apparent that nitric acid can be added to the reaction medium.

The nitrogen oxide compounds when used in low concentrations are not reactants in the reaction but function as catalysts. During the oxidation no additional nitrogen oxide need be added; however, some volatile nitrogen oxide is lost during distillation to recover the products and, accordingly, addition of slight amounts of nitrogen oxide compounds may be necessary in a continuous process.

It is important to my oxidation that the nitrogen oxides be used in far less than the stoichiometric amount necessary if the nitrogen oxide were the only source of oxidant. The use of greater amounts of a nitrogen oxide compound particularly the use of stoichiometric amounts or greater, is not desirable and should be avoided since the presence of an excess of a strong oxidizing agent results in an extremely high yield of carbon oxides with corresponding low yields of the desired acetic acid product.

The preferred reaction solvent is acetic acid, however other preferred reaction solvents that can be employed are the various alkanoic acids, particularly propionic, butyric and valeric acids. Other organic liquids that are inert to the reaction can of course be employed including any of the following: halogenated hydrocarbons such as methylene chloride, chloroform, carbon tetrachloride, dichloropropane, chlorobenzene, bromobenzene, orthodichlorobenzene, etc.; hydrocarbons such as pentane, hexane, benzene, heptane, toluene, octane, xylene, nonane, etc.; ethers such as diisopropyl ether, propylene glycol dimethyl ether, ethylene glycol diethyl ether (diethyl Cellosolve), dibutyl ether, monomethyl glycol acetate (methyl Cellosolve acetate), methyl orthotolyl ether, diisoamyl ether, methyl paratolyl ether, methyl metatolyl ether, ethylene glycol diethyl ether, etc.; and miscellaneous solvents such as nitrobenzene, gamma-butyrolactone, tetramethylene sulfone, formamide, N,N-dimethyl formamide, N,N-methyl acetamide, N-methyl pyrrolidone, etc. As previously mentioned, however, the preferred reaction solvent is acetic acid although various amounts of the aforementioned solvents can be used in combination with acetic comprising up to about 50 volume percent of the mixture.

The reaction conditions are relatively mild, temperatures between about 20° and about 200° C.; preferably between about 50° and about 150° C.; can be used. Sufficient pressure should be employed to maintain liquid phase conditions of the acetaldehyde reactant under the reaction temperature, generally between about 1 and about 100 atmospheres and preferably between about 10 and about 50 atmospheres, are employed. In general, higher pressures favor somewhat higher conversions. Under the aforesaid conditions, the oxidation is rapid and reaction times between about 5 and about 60 minutes can be expected.

My invention is employed in combination with a vinyl acetate synthesis that comprises oxidation of ethylene with an oxygen containing gas by contacting the ethylene and oxygen with an acetic acid solution containing catalytic amounts of a platinum group metal. In this oxidation, a substantial quantity of acetaldehyde is produced and is recovered during purification of the vinyl acetate product. In accordance with my invention, the acetaldehyde byproduct from the vinyl acetate synthesis is oxidized to acetic acid in the presence of catalytic amounts of a nitrogen oxide, preferably a soluble nitrite or nitrate salt, and the resulting acetic acid is used to replace the acetic acid consumed in the synthesis of the vinyl acetate. The oxidation can be performed in the same reaction zone used for the vinyl acetate synthesis when the commonly used heavy metal redox salts are eliminated from the reaction medium in favor of soluble nitrogen oxide salts. The nitrogen oxides then serve as redox agents for the platinum group metal catalyst of the vinyl acetate synthesis and also as the catalyst for the acetaldehyde to acetic acid oxidation.

In the preferred process, the two oxidation steps, i.e., the vinyl acetate synthesis and the acetaldehyde oxidation, are performed in separate reaction zones and the process streams are combined in a unique fashion to provide a single unitary process with a beneficial result from the combination being obtained in each oxidation step. To illustrate, the presence of trace or catalytic amounts of nitrogen oxides in the vinyl acetate reaction profoundly increases the rate of reaction. Additionally, I have observed that the presence of nitrogen oxides in the crude product obtained from the vinyl acetate synthesis step eliminates the objectionable tendency of the platinum group metal to plate out as a mirror from the crude product during distillation. Because the platinum group metals do not adversely affect the acetaldehyde oxidation step, their presence in the reaction medium for this step is not objectionable and a common reaction medium can therefore be used. Finally, the acetic acid obtained from the acetaldehyde oxidation of my invention is highly pure since it contains only minor amounts of carbon diode and therefore the crude oxidate from this step can be passed directly to the vinyl acetate reactor.

For oxidation of ethylene to vinyl acetate, the catalyst solution should contain a platinum group metal and a halogen as well as the aforemention nitrogen oxide compounds. The platinum group metal, i.e., platinum, rhodium, ruthenium, osmium, iridium and palladium are all active for my reaction; however, palladium is preferred because of its much greater activity. In general, the platinum group metal can be employed in amounts between about 0.001 and 5.0 weight percent of the liquid reaction medium. In general, however, the reaction rate decreases at concentrations of noble metal less than about 0.04 weight percent and amounts of noble metal in excess of about 0.25 weight percent do not affect the rate of oxidation. Accordingly, the preferred limit of the platinum group metal is between about 0.04 and about 0.25 weight percent of the catalyst solution. The platinum group metal can be added to the reaction medium as finely divided metal, as a soluble salt or as a chelate. Examples of suitable salts are the halides and acetates such as palladium chloride, rhodium acetate, ruthenium bromide, osmium oxide, iridium chloride and palladium chloride. Examples of suitable chelates are palladium acetylacetonate and complexes of noble metal ions with such conventional chelating agents as ethylene diamine tetraacetic acid, citric acid, etc.

The other necessary component of the catalyst solution employed in reactor 2 is a soluble halide, i.e., bromide or chloride. The halogen can be added as elemental chlorine or bromine; however, it is preferred to employ less volatile halides such as hydrogen chloride, hydrogen bromide; alkali metal halides, e.g., sodium chloride, lithium bromide, cesium chloride, potassium bromide, ammonium halides, ammonium bromide, ammonium chloride; or any of the aforementioned platinum group metal bromides or chlorides. Sufficient of the aforementioned halide should be added to provide between about 0.05 and about 5.0 weight percent halogen in the reaction zone; preferably concentrations between about 0.1 and about 3.0 are employed. The choice between the use of a bromide or a chloride can be made with due regard to the desired reaction. In general, I have found that the chloride compounds tend to favor the oxidation to acetaldehyde and, ultimately, to acetic acid, whereas the bromide compounds tend to favor the oxidation of ethylene to vinyl acetate.

The composition of the reaction medium exerts a considerable effect on the yield of various products, vinyl acetate, acetaldehyde, and acetic acid, as well as on the rate of oxidation. In general, the yield of vinyl acetate is maximized by use of an anhydrous or substantially anhydrous reaction medium and by the presence of acetate ions; increased acetaldehyde production occurs with increased water content in the reaction medium and acetic acid production increases concurrently therewith.

For the production of vinyl acetate, the water content of the reaction medium should be less than about 20 weight percent; preferably should be between about 0 and about 10 weight percent, and most preferably between about 0 and about 3 weight percent. The amount of water in the reaction medium substantially affects the reaction rate in general, the production of vinyl acetate in an anhydrous reaction medium is exceedingly rapid and the addition of amounts of water in excess of about 2 to 3 weight percent substantially decreases the rate of oxidation.

As previously mentioned, the reaction medium should comprise acetic acid; however, the presence of other organic solvents that are inert under the oxidation conditions is not precluded. Examples of various organic liquids that can also be present in amounts from about 0 to about 90 percent of the reaction medium include formamide, dimethyl formamide, chlorobenzene, dichlorobenzene, aliphatic hydrocarbons such as hexane, decane, dodecane, etc.; toluene; however aliphatic acids having two to about five carbons, i.e., acetic, propionic, butyric, valeric, isovaleric, caproic, isocaproic, succinic, gluteric, adipic, pimellic, etc., can be used. Of these, acetic is preferred as the entire reaction medium.

The proportion of vinyl acetate in the oxidized product can be greatly increased by the addition of acetate salts to the reaction medium. Generally any soluble acetate salts can be added such as alkali metal acetates, alkaline earth acetates, any of the aforementioned Group VIII noble metal acetates or an acetate of the optional redox metals hereafter described. The alkali metal acetates are preferred for their greater solubility in the medium and of these lithium acetate is most preferred. Generally between about 0.1 and about 10 weight percent of a soluble acetate salt is used; preferably between about 0.5 and about 5.0 weight percent is employed. The particular alkali metal chosen has some effect on the distribution of products; the use of sodium and potassium acetates generally favor acetaldehyde and vinyl acetate production and the lithium salts favor acetic acid production. Lithium salts, however, are preferred because of their greater solubility and hence, the higher acetate ion concentration that can be achieved with the use of lithium.

It is of course apparent that the acetate salts can be formed in situ by the addition of hydroxides of most of the aforementioned metals, particularly the alkali metal hydroxides or halides.

Referring now to the figure, the adoption of my preferred embodiment of the invention in a combined vinyl acetate synthesis reaction will be described. Ethylene is supplied to the oxidation system through line 1 at a suitable pressure, e.g., between about 300 and 1500 p.s.i.g. and introduced into the vinyl acetate reactor 2 together with recycle ethylene gas from line 8. An oxygen-containing gas such as oxygen, air or mixtures thereof is introduced through line 3. The reactor can comprise a stirred liquid phase reaction system, a packed bed of a solid substrate impregnated with a platinum group metal such as silica gel, diatomaceous earth, activated carbon, etc., or a fluidized system of the aforementioned impregnated solid. The platinum group metal, e.g., platinum, iridium, rhodium, palladium, rhenium, osmium and ruthenium (preferably palladium) remains on the solid support in the reactor. In this manner, a relatively high concentration of the platinum group metal can be maintained in the reaction zone while retaining a relatively low concentration, e.g., less than 0.1 and frequently less than about .05 weight percent platinum group metal in the reactor effluent removed through line 4. In general, solids containing from about 0.5 to about 5 weight percent impregnated platinum group metal are employed in the reactor. The solids can have a particle size ranging from about 10 to about 400 mesh U.S. Standard, preferably having between about 10 and about 100 mesh size for a packed reactor and between about 100 and 400 mesh for a fluidized reactor. As previously mentioned, however, the reactor can comprise simply a vessel equipped with stirring means in which liquid phase conditions are employed.

In general the oxidation is performed by introducing oxygen or an oxygen-containing gas and ethylene into contact with the catalyst at temperatures between about 30° and about 300° C.; 90° to about 180° C. are preferred and, to obtain optimum yields of vinyl acetate, temperatures between about 120° and about 160° C. are most preferred. In general, the yield of acetic acid is favored at higher temperatures and when operating so as to generate sufficient acetic acid in situ to equal that consumed in the formation of vinyl acetate, the higher temperatures are preferred, from about 130° to about 180° C.

The reaction pressures employed are sufficient to maintain liquid phase conditions and from about atmospheric to about 100 atmospheres or more; preferably elevated pressures from about 10 to about 75 atmospheres are employed and most preferably, pressures from about 40 to about 75 atmospheres are employed to obtain a high reaction rate. In general, high pressures and high ethylene partial pressures result in increased or maximum acetaldehyde and vinyl acetate yields and minimum yields of acetic acid. Additionally, the higher ethylene partial pressures favor high reaction rates.

Under the aforedescribed conditions, the ethylene is rapidly oxidized to the desired carbonyl compounds. In general, the liquid catalyst solution is supplied and recycled to the reaction zone at maximum rates to prevent the accumulation of substantial amounts of water which will reduce the rate of oxidation.

The effluent removed from the reactor through line 4 is passed to a vessel 5 where the pressure is reduced and dissolved unconverted ethylene and residual gases are removed overhead through line 6, cooler 7, to pump 9 where the gas are repressured for recycling through line 8. Because a slight conversion to carbon oxides is experienced in the oxidation, all or a portion of the recycle gas stream can be passed through a suitable absorption unit for removal of the carbon oxides, e.g., by absorbing the carbon oxides in an alkali metal hydroxide or enthanolamine solution. Such an absorption step is shown in tower 10. The depressed crude product is removed from vessel 5 through line 11 and passed to a crude product fractionation zone 12. When an inert solid catalyst support is not employed in reactor 2, a considerable quantity of suspended metallic palladium is present in the depressured liquid product removed from vessel 5. Preferably, in this embodiment, the resulting slurry is passed through line 13 to a liquid centrifugal separator 14 where the suspended platinum group solid metal is removed through stand pipe 15 and a clear liquid product is removed through line 16 for passage to vessel 12. Heat for distillation is supplied to the liquid in the distillation zone 12 through reboiler 17 and the residual gases are recovered from the top of tower 12 through line 18 and repressured by pump 19 for recycling to the vinyl acetate synthesis.

The liquid residue comprising chiefly the acetic acid reaction medium and trace amounts of the platinum group metal with the nitrate cocatalyst are removed through line 20 from tower 12 and pumped by pump 21 to line 22 for recycling to the vinyl acetate oxidation zone. A portion of the recycle acetic acid solution can be passed through line 23 to stand pipe 15 to suspend the platinum group metal separated in the centrifugal separator 14. The resultant slurry is pressured by pump 24 and passed through line 25 to the recycle line 22.

The crude product containing the vinyl acetate product and various byproducts of the oxidation including acetaldehyde, methyl acetate, ethyl acetate, ethylene oxide, etc., is removed from distillation zone 12 through line 26 and passed to the acetaldehyde fractionation zone 27. The volatile components, e.g., acetaldehyde and ethylene oxide, when present, are removed as overhead from this distillation through line 28, cooled in condenser 29 and the liquid condensate recovered in distillate drum 30. Non-condensible gases are removed through line 31 for fuel. The distillate is removed from drum 30 by line 32, pump 33 and a portion is returned to distillation zone 27 as reflux through line 34. The remainder of the acetaldehyde product is passed through line 35 to either recovery as a saleable byproduct, line 36 or, in accordance with my invention, to further oxidation through line 37.

Advantageously, a portion of the recycle acetic acid catalyst solution from the vinyl acetate reaction zone is passed through line 38 and combined with the acetaldehyde reactant of line 37. These combined streams are pressured in pump 39 and passed through line 40 to the acetaldehyde reactor 41. A suitable oxygen containing gas, e.g., oxygen, air, mixtures of oxygen with air or nitrogen, is introduced through line 42 to oxidize the acetaldehyde to acetic acid in accordance with my invention. Generally, a sufficient amount of nitrate will be supplied to the oxidation zone in the vinyl acetate catalyst solution withdrawn through line 38. However, if insufficient nitrate is present, a suitable nitrogen oxide compound such as aforementioned can be introduced through line 43. The aforementioned oxidation conditions are controlled in reactor 41 to secure a high yield of acetic acid from the acetaldehyde byproduct. This product is removed through line 44 and cooler 45 for recycling to the vinyl acetate reactor through line 22. Because the yield of acetic acid is extremely high in the oxidation according to my invention, the crude oxidate can be passed directly to the vinyl acetate reactor without necessity for removal of carbon oxides or water formed by undesired byproduct oxidation, however it is within the scope of my invention to cool the oxidate, separate the incondensible gases, i.e., carbon dioxide, and pump the liquid to the vinyl acetate reactor 2.

The vinyl acetate product of the reaction is recovered through line 46 as a crude material in an aqueous acetic mixture with trace amounts of ethyl acetate and methyl acetate. This crude product can be subjected to purification, e.g., azeotropic distillation to remove an azeotrope of vinyl acetate and water, subsequent separation of the azeotrope into an organic, vinyl acetate component and an aqueous fraction. Pure vinyl acetate can be obtained by stripping the separated organic components to free it of any residual water. The methyl acetate and ethyl acetate can be recovered as useful products or used as fuel for the process. These products can also be recycled to line 22 and vinyl acetate reactor 2 for conversion to acetic acid and, ultimately, vinyl acetate.

The combination of the acetaldehyde oxidation of my invention using a nitrate or nitrogen oxide catalyst and liquid phase oxidation conditions is advantageously combined with the described vinyl acetate synthesis reaction in that the crude oxidate of the acetaldehyde oxidation can be combined directly with the recycle stream to the vinyl acetate synthesis to serve as a supply of acetic acid thereto. Additionally, the presence of the nitrogen oxide in the vinyl acetate reaction is beneficial as these oxides greatly improve the rate of oxidation and synthesis of vinyl acetate. Finally, the presence of nitrate or nitrogen oxides in the crude synthesis product from the vinyl acetate reactor substantially prevents or inhibits the plating out of the palladium metal catalyst upon subsequent distillation. Accordingly, this combination of steps results in a highly beneficial combination having processing characteristics greatly improved from either of the processes considered independently.

My invention will now be described by the following examples:

Example 1

To a titanium lined autoclave was charged 100 grams acetaldehyde in 500 grams of acetic acid with a catalyst containing 5.0 grams lithium nitrate, 5.0 grams lithium acetate, 5.0 grams lithium chloride and 1.0 gram palladium chloride. The autoclave was closed, heated to 200° F., pressured to 700 p.s.i.g. with nitrogen and oxygen was then introduced slowly while maintaining the temperature at 250° F. The reaction period was 30 minutes, upon completion of which the autoclave was cooled, depressured and the liquid contents analyzed for unconverted acetaldehyde and acetic acid product. A total of 3.5 grams unconverted acetaldehyde were obtained, demonstrating that the conversion rate was 96.5%. The mol percent yields of acetic acid was 97.5% and of carbon dioxide 2.5%.

This experiment demonstrates that extremely high yields of acetic acid and high conversion rates can be obtained while employing nitrogen oxides in the catalyst solution customarily employed for the synthesis of vinyl acetate by the oxidation of ethylene with an oxygen containing gas.

Example 2

To a one-half gallon titanium lined autoclave fitted with a stirrer and cooling coil were charged 1.0 gram palladium chloride, 5.0 grams lithium chloride, 5.0 grams lithium acetate dihydrate, 5.0 grams of cupric acetate monohydrate, 100 grams of acetaldehyde and 500 grams of acetic acid. The autoclave was closed and the mixture heated to 250° F. and pressured to 700 p.s.i.g. with nitrogen. Oxygen was thereafter added in small increments over a 30-minute reaction period while cooling water was circulated to hold the temperature at about 250° F. Upon completion of the 30-minute reaction period, the autoclave was cooled, depressured and the liquid and gaseous products collected and analyzed to recover 48 grams of unreacted acetaldehyde for a conversion rate of 52%. The products recovered were acetic acid at 85 mol percent yield and carbon dioxide at 15 mol percent yield.

This experiment shows the low conversion rates and high conversion to carbon oxides which are characteristic of catalysts compositions containing copper salts.

Example 3

The following example illustrates the results obtained when the oxidation is conducted in the presence of a stoichiometric amount of nitric acid as the oxidant.

To a 4-liter autoclave were charged 100 grams of acetaldehyde and 500 grams of acetic acid. The autoclave was closed and heated to 250° F. and thereafter 100 milliliters of nitric acid (70% concentration) was slowly introduced over a period of 30 minutes. At the end of the 30-minute reaction period, the autoclave was cooled, opened and the liquid product removed. The liquid product contained a net total of about 68 grams acetic acid and 41.3 grams of acetaldehyde. The total conversion to products based on the consumed acetaldehyde was 58.7%. The yield of acetic acid comprised 85 mol percent and the yield of carbon oxides was 15 mol percent, indicating the low efficiency of this method of oxidation. An analysis of the gas obtained from the oxidation indicated the presence of 11% carbon monoxide and 20% carbon dioxide and the balance was nitrogen oxides.

Example 4

Into a one-half gallon autoclave were charged 6 grams lithium chloride, 6 grams lithium acetate, 6 grams sodium nitrate, 1 gram palladium chloride, 500 grams acetic acid and 50 grams acetaldehyde. The autoclave was closed, heated to 250° F. and pressured with ethylene to 750 p.s.i.g. Oxygen and ethylene were then intermittently added over a 30-minute reaction period. Upon completion of the reaction period the autoclave was cooled, depressured, opened and the liquid contents removed and distilled to separate the volatile products from the liquid residue. A portion of the liquid reactants were titrated to determine the acetic acid content for calculation of the yield of acetic acid. The yield of products obtained during the oxidation is set forth in Table 1 which also tabulates the results from three successive recycle experiments.

The liquid residue from the distillation, i.e., the fraction boiling in excess of 100° C. at atmospheric pressure, was reconstituted by the addition of acetic acid to provide 519 grams of liquid which by titration contained 470 grams of actic acid. To this reaction residue was added 50 grams acetaldehyde and the reaction mixture was returned to the autoclave and the oxidation was repeated. After a 30-minute reaction period the autoclave was again cooled, depressured, opening and the contents thereof distilled to separate the products boiling below 100° C. at atmospheric pressure. A portion of the crude reaction product was titrated to determine the acetic acid content and the yield of acetic acid and volatile products were determined and are set forth in the following Table 1.

The bottoms from the distillation were again reconstituted by the addition of sufficient acetic acid to prepare 550 grams which contains 493 grams acetic acid as determined by titration with base. To the mixture was added 50 grams acetaldehyde and the reaction mixture was returned to the autoclave for the second recycle experiment.

The oxidation was again repeated and upon completion of a 30-minute reaction period the autoclave contents were sampled, titrated to determine acetic acid content and then distilled to recover the volatile products boiling below 100° C. at atmospheric pressure. The catalyst residue from the distillation was reconstituted by the addition of sufficient acetic acid to prepare 577 grams of a crude reaction mixture which contained 508 grams acetic acid. To the reaction mixture was added 50 grams acetaldehyde and 5 milliliters concentrated nitric acid and the resultant mixture was returned to the autoclave in a third recycle experiment.

In the third experiment the reaction was slow to initiate and 5 milliliters concentrated hydrochloric acid was added to offset any chloride losses which may have occurred during the experiments. Upon the addition of the hydrochloric acid, a good reaction rate was observed for 30 minutes. Upon completion of the 30-minute reaction period the liquid product was sampled, the sample titrated to determine the acetic acid content and the crude reaction product was then distilled at atmospheric pressure to separate the volatile products. The distillation bottoms were then vacuum distilled to recover a diester fraction and an acetic acid from a viscous polymer bottoms. The diester distillate was refractionated to recover acetic acid and a diester product comprising a mixture of ethylidene diacetate and glycol diacetate.

Table 1 summarizes the yields of products obtained during this oxidation.

TABLE 1.—PRODUCT YIELDS, MOL PERCENT OF ETHYLENE CONVERTED

| Product | Initial | Recycle 1 | Recycle 2 | Recycle 3 |
|---|---|---|---|---|
| Acetaldehyde | 1.2 | −1.0 | −4.9 | −4.9 |
| Vinyl acetate | 47.0 | 55.7 | 58.1 | 48.6 |
| Diesters [1] | | | | 8.3 |
| Polymer [1] | | | | 2.7 |
| Acetic acid | 31.4 | 39.1 | 45.7 | 47.2 |
| Methyl acetate | 8.6 | 6.2 | 7.1 | 5.5 |
| Ethyl acetate | 1.8 | | | 1.7 |

[1] The diesters and polymer were not isolated between the recycle experiments and the yield after third recyle is the total produced during all four experiments.

During the oxidation the gases from the autoclave were vented and sampled and submitted for gas chromatography analysis. The following table summarizes the contents of these gases:

TABLE 2.—MOL PERCENT IN OFF-GASES

| Gas | Initial | First recycle | Third recycle |
|---|---|---|---|
| $N_2$ | 1.58 | 1.31 | 0.25 |
| $O_2$ | 2.42 | 2.36 | 3.65 |
| $CO_2$ | 2.34 | 1.92 | 1.94 |
| $C_2H_4$ | 92.24 | 94.02 | 93.98 |
| $C_3$ | 0.34 | 0.14 | 0.19 |
| $C_4$ | 1.08 | 0.25 | 0.19 |

Example 4 was repeated, however to the reaction mixture was also added 6 grams cupric acetate to demonstrate the effect of cupric salts on the oxidation. All other reaction conditions were identical to those employed in Example 4. After the 30-minute reaction period the autoclave was cooled, depressured and opened and the crude reaction product was fractionated to recover the products produced by the oxidation. A sample of the crude reaction product was titrated to determine the acetic acid content and an analysis of gas samples collected during the oxidation was performed. The following table summarizes the yields of products obtained by this oxidation:

TABLE 3

| Product: | Mol percent of ethylene converted |
|---|---|
| Acetaldehyde | 4.4 |
| Vinyl acetate | 48.6 |
| Diesters | 8.0 |
| Polymer | 2.6 |
| Acetic acid | 33.0 |
| Methyl acetate | 2.6 |
| Ethyl acetate | 0.8 |

TABLE 4

| Gas: | Mol percent in off-gases |
|---|---|
| $N_2$ | 1.62 |
| $O_2$ | 4.9 |
| $CO_2$ | 2.84 |
| $C_2H_4$ | 89.95 |
| $C_3$ | 0.10 |
| $C_4$ | 0.59 |

A comparison of the yields of oxidized products reveals that the use of the combined cupric salt and nitrate reduced the amount of acetaldehyde oxidized in the oxidation zone and reduced the quantity of acetic acid produced. A comparison of the gas analysis also reveals that the cupric-nitrate combination produced measurably greater quantities of carbon dioxide than use of the nitrate alone. This finding confirmed the result set forth in Example 2 when the oxidation was performed in the absence of ethylene.

The preceding examples are intended solely to illustrate a mode of practicing the invention and to demonstrate results obtainable thereby. It is not intended that these examples be construed as unduly limiting of the invention but instead it is intended that the invention be defined by the steps and reagents and their obvious equivalents set forth in the following claims.

I claim:
1. The synthesis of vinyl acetate by the catalytic oxidation of ethylene that comprises contacting, in a reaction zone, ethylene and oxygen with a substantially anhydrous acetic acid medium containing between about 0.01 and about 1.0 weight percent of a platinum group metal between about 0.05 and 5.0 weight percent of hydrogen, ammonium or alkali metal bromide or chloride and, as the sole redox agent for said platinum group metal, between about 0.05 and about 5.0 weight percent of ammonium or alkali metal nitrite or nitrate or nitric acid at temperatures between about 20° and about 200° C. and sufficient pressure to maintain liquid phase conditions in the oxidation zone, recovering a crude liquid product containing vinyl acetate and an acetaldehyde byproduct, distilling said crude oxidate to recover said acetaldehyde and vinyl acetate recycling said acetaldehyde to said reaction zone while continuing said contacting of ethylene and oxygen with said medium to thereby oxidize said acetaldehyde to acetic acid to replace the acetic acid consumed in the synthesis of said vinyl acetate.

2. The synthesis of vinyl acetate by the catalytic oxidation of ethylene that comprising contacting, in a reaction zone, ethylene and oxygen with a substantially anhydrous acetic acid medium containing between about 0.01 and about 1.0 weight percent of a platinum group metal, between about 0.05 and 5.0 weight percent of hydrogen, ammonium or alkali metal bromide or chloride, and, as the sole redox agent for said platinum group metal, between about 0.01 and about 3 weight percent of a nitrogen oxide salt selected from the class consisting of ammonium and alkali metal nitrates and nitrites or nitric acid, maintaining said reaction zone at temperatures between about 20° and about 200° C. and sufficient pressure to maintain liquid phase conditions in the oxidation zone, recovering a crude liquid product containing vinyl acetate and acetaldehyde byproduct, distilling said crude oxidate to recover said acetaldehyde, vinyl acetate and a liquid residue compressing acetic acid and said platinum group metal and said nitrogen oxide salt, combining a portion of said liquid residue with said acetaldehyde, and contacting said combined stream with oxygen at a temperature between about 20° and about 200° C. and sufficient pressure to maintain liquid phase conditions to thereby oxidize said acetaldehyde to acetic acid to replace that acetic acid depleted in the synthesis of vinyl acetate from ethylene.

3. The synthesis of claim 2 wherein said substantially anhydrous acetic acid medium contains from 0 to about 10 weight percent water.

4. The synthesis of claim 2 wherein the temperature of said vinyl acetate synthesis reaction is maintained at about 90° to about 180° C.

5. The synthesis of claim 1 wherein said platinum group metal is present in said reaction medium as an acetate, halide or soluble chelate.

6. The synthesis of vinyl acetate by the catalytic oxidation of ethylene that comprises contacting, in a reaction zone, ethylene and oxygen with a substantially anhydrous acetic acid medium containing between about 0.01 and about 1.0 weight percent of a platinum group metal, between about 0.05 and 5.0 of hydrogen, ammonium or an alkali metal bromide or chloride, and, as the sole redox agent for said platinum group metal, introducing into said reaction zone a nitrogen oxide gas to provide between about 0.01 and about 3 weight percent of said nitrogen oxide gas therein, maintaining said reaction zone at temperatures between about 20° and about 200° C. and sufficient pressure to maintain liquid phase conditions in the oxidation zone, recovering a crude liquid product containing vinyl acetate and an acetaldehyde byproduct, distilling said crude oxidate to recover said acetaldehyde and vinyl acetate and recycling the combined stream to said reaction zone while continuing said contacting of ethylene and oxygen with said medium to thereby oxidize said acetaldehyde to acetic acid to replace the acetic acid consumed in the synthesis of said vinyl acetate.

References Cited

UNITED STATES PATENTS 1,081,959  12/1913  Grunstein _____ 260—530

FOREIGN PATENTS 614,970  9/1962  Belgium.

LORRAINE A. WEINBERGER, *Primary Examiner.*

V. GARNER, *Assistant Examiner.*

U.S. Cl. X.R.

260—530, 604